United States Patent
Cicala et al.

(10) Patent No.: US 6,994,647 B2
(45) Date of Patent: Feb. 7, 2006

(54) ADAPTIVE PRESSURE CONTROL METHOD FOR ACHIEVING SYNCHRONOUS UPSHIFTS IN A MULTIPLE-RATIO TRANSMISSION

(75) Inventors: Steve Cicala, Dearborn Heights, MI (US); Brian Keyse, Farmington Hills, MI (US); Ihab Soliman, Dearborn, MI (US); Charles Suter, South Lyon, MI (US); Kurt Nickerson, Farmington, MI (US); Bradley Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 130 days.

(21) Appl. No.: 10/712,071

(22) Filed: Nov. 13, 2003

(65) Prior Publication Data

US 2005/0107201 A1    May 19, 2005

(51) Int. Cl.
*F16H 61/06*    (2006.01)

(52) U.S. Cl. ..................... 475/121; 475/127
(58) Field of Classification Search ........... 477/143, 477/154, 156; 475/120, 121, 127; 701/58, 701/59
See application file for complete search history.

(56) References Cited

U.S. PATENT DOCUMENTS

| | | | |
|---|---|---|---|
| 5,072,390 A * | 12/1991 | Lentz et al. | 477/154 |
| 5,119,697 A * | 6/1992 | Vukovich et al. | 477/155 |
| 5,553,694 A | 9/1996 | Schulz et al. | |
| 5,722,519 A | 3/1998 | Kirchhoffer | |
| 5,758,302 A | 5/1998 | Schulz et al. | |
| 5,853,349 A * | 12/1998 | Shimada et al. | 477/143 |
| 5,951,615 A * | 9/1999 | Malson | 701/59 |
| 6,292,731 B1 | 9/2001 | Kirchhoffer | |
| 6,292,732 B1 * | 9/2001 | Steinmetz et al. | 475/120 |
| 6,370,463 B1 | 4/2002 | Fujii et al. | |
| 6,577,939 B1 | 6/2003 | Keyse et al. | |

* cited by examiner

*Primary Examiner*—Sherry Estremsky
(74) *Attorney, Agent, or Firm*—David B. Kelley; Brooks & Kushman

(57) ABSTRACT

An adaptive shift control method for a geared multiple ratio transmission having friction elements for clutches and brakes to establish and disestablish gear ratio changes wherein at least one ratio change involves engagement of one friction element in synchronism with disengagement of another friction element. Operating parameters are adapted throughout the life of the transmission to reduce synchronous errors by developing and learning pressure and time adjustments for the friction elements.

35 Claims, 5 Drawing Sheets

ADAPTIVE PRESSURE CONTROL METHOD FOR ACHIEVING SYNCHRONOUS UPSHIFTS IN A MULTIPLE-RATIO TRANSMISSION

BACKGROUND OF THE INVENTION

1. Field of the Invention

The invention relates to automatic transmissions for automotive vehicles wherein ratio changes between at least one pair of ratios involves engagement or disengagement of one friction element in synchronism with the disengagement or engagement, respectively, of another friction element.

2. Background Art

Multiple-ratio automotive vehicle powertrains include transmissions of the kind shown, for example, in U.S. Pat. Nos. 6,292,731; 5,722,519; 5,553,694; 5,758,302; 6,370,463; and 6,577,939. These are examples of transmissions having gearing with multiple ratios wherein the gear elements of the gearing are controlled by friction clutches or brakes (i.e., torque transfer friction elements) to establish and to disestablish each of several forward driving ratios and one or more reverse ratios.

When the vehicle accelerates from a standing start, the engine delivers power to the traction wheels as the overall transmission ratio progresses from an initial low speed ratio to a high speed ratio with ratio steps between the lowest and the highest ratios. If a ratio change requires engagement of one friction element as the companion friction element is disengaged, the friction elements must engage and disengage in synchronism. Precise synchronization is required to achieve acceptable shift quality. It is necessary, furthermore, for the synchronization to be maintained throughout the life of the transmission, notwithstanding the presence of wear of the torque transfer friction elements and changes in the environmental conditions, such as temperature changes, lubricant viscosity changes, and changes in coefficients of friction for the friction elements.

Errors in synchronization during gear ratio changes cause inertia torque disturbances that have a significant adverse effect on overall shift quality. One of these adverse effects is referred to as a ratio flare condition at the beginning of a ratio change. Another adverse effect is a gear element tie up condition. Either of these adverse effects can cause a perceptible torque disturbance at the torque output shaft for the transmission.

A ratio flare condition occurs when the pressure on the offgoing friction element is too low at the beginning of a ratio change before a torque transfer to the oncoming clutch occurs. To ensure that the oncoming friction element pressure is adequate to initiate a shift and to ensure that the oncoming friction element is filled at the beginning of a shift, the friction element pressure is boosted. If the boost time is insufficient, it is possible to cause a flare condition to occur during torque transfer to the oncoming friction element.

A gear element tie up condition occurs when the friction elements are momentarily applied simultaneously. This can occur if the oncoming friction element boost time is too long.

SUMMARY OF THE INVENTION

The present invention is a method for controlling a synchronous upshift of the transmission as torque is transferred from an offgoing clutch to an oncoming clutch. The invention includes the use of a controller for adapting measured variables or conditions for the transmission clutches and brakes so that adjustments can be made continuously throughout the life of the transmission to eliminate boost time errors, offgoing clutch starting pressure errors, and oncoming clutch starting pressure errors. The method of the invention detects deviations from calibrated values for these parameters so that errors can be measured and stored during each control loop of an electronic microprocessor module of the controller. A correct boost time, a correct oncoming clutch starting pressure, and a correct offgoing clutch starting pressure thus can be "learned" so that the critical characteristics of a synchronous upshift can be corrected during subsequent shifts, thereby eliminating or substantially reducing synchronization errors.

The adaptive controller of the present invention uses a PID (proportional-integral-derivative) control unit for controlling friction element pressures. Such an adaptive control system is disclosed in co-pending U.S. patent application Ser. No. 10/712,683, entitled "An Electronic Adaptive Swap-Shift Control For An Automatic Transmission For Automotive Vehicles," filed Nov. 13, 2003, by Ihab S. Soliman, Brian Keyse and Brad Riedle, which is assigned to the assignee of the present invention. The disclosure of that co-pending patent application is incorporated herein by reference. Other types of closed-loop controllers can be used if that is preferred.

The present invention follows a priority schedule for correcting errors in those conditions that affect upshift quality. If multiple errors are detected, the priority scheduling of the control method will determine which error is corrected first. It is possible, in some instances, for multiple errors to be detected and corrected simultaneously.

DETAILED DESCRIPTION OF AN EMBODIMENT OF THE INVENTION

Figures 1, 1A:
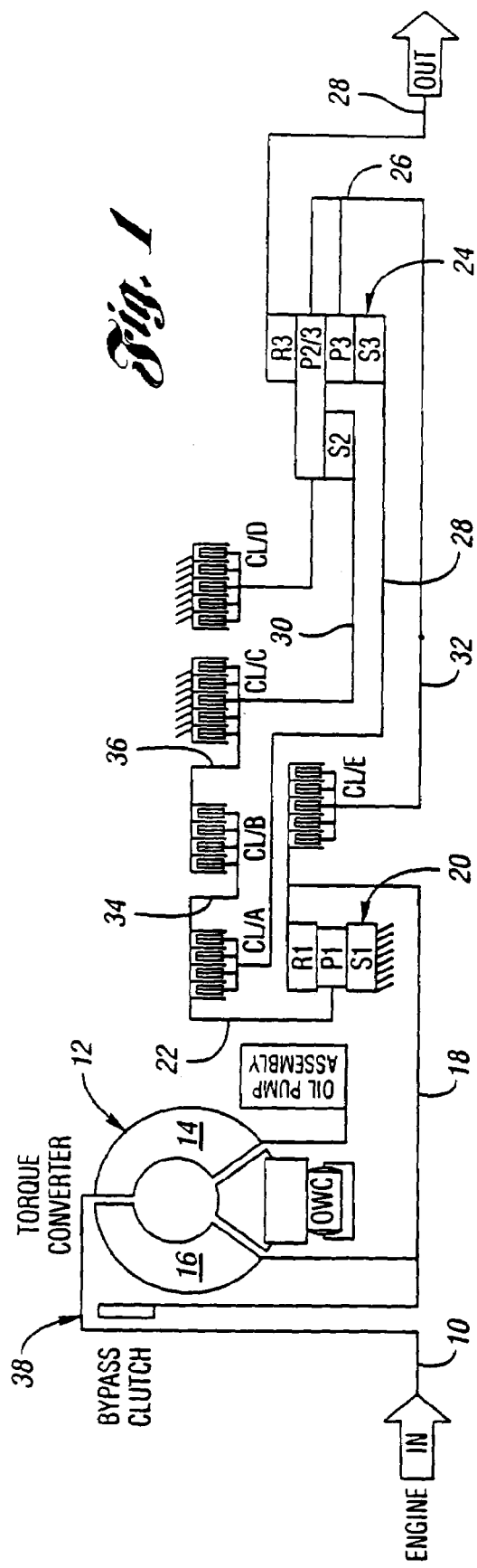
FIG. 1 is a schematic diagram of a gearing arrangement for a transmission capable of embodying the adaptive control of the present invention.
FIG. 1a is a chart showing the clutch and brake friction element engagement and release pattern for establishing each of six forward driving ratios and a single reverse ratio for the transmission schematically illustrated in FIG. 1.

The transmission schematically illustrated in FIG. 1 is an example of a multiple-ratio transmission capable of being controlled using the method of the invention, wherein ratio changes are controlled by friction elements acting on the individual gear elements. Engine torque from the vehicle engine is distributed to torque input element 10 of hydrokinetic torque converter 12. The impeller 14 of the torque converter 12 develops turbine torque on turbine 16 in known fashion. Turbine torque is distributed to turbine shaft 18.

The transmission of FIG. 1 includes a simple planetary gearset 20 and a compound planetary gearset 24. Gearset 20 has a permanently fixed sun gear S1, a ring gear R1 and planetary pinions P1 rotatably supported on carrier 22. Turbine shaft 18 is drivably connected to ring gear R1.

Compound planetary gearset 24, sometimes referred to as a Ravagineaux gearset, has a small pitch diameter sun gear S3, a torque output ring gear R3, a large pitch diameter sun gear S2 and compound planetary pinions. The compound planetary pinions include long planetary pinions P 2/3, which drivably engage short planetary pinions P3 and torque output ring gear R3. Short planetary pinions P3 drivably engage small pitch diameter sun gear S3.

The planetary pinions of gearset 24 are rotatably supported on compound carrier 26.

Ring gear R3 is drivably connected to torque output shaft 28, which is drivably connected to vehicle traction wheels, not shown, through a differential-and-axle assembly.

Gearset 20 is an underdrive ratio gearset arranged in series disposition with respect to compound gearset 24. During operation in the first four forward driving ratios, carrier P1 is drivably connected to sun gear S3 through shaft 28 and clutch A. A clutch B drivably connects carrier 22 to shaft 30, which is connected to large pitch diameter sun gear S2.

During operation in the fourth, fifth and sixth forward driving ratios, clutch E connects turbine shaft 18 to compound carrier 26 through shaft 32.

Friction element C acts as a reaction brake for sun gear S2 during operation in second and sixth forward driving ratios.

During operation of gearset 24 in third ratio, clutch B is applied together with clutch A. The elements of gearset 24 then are locked together to effect a direct driving connection between shaft 32 and output shaft 28.

A downshift from the third ratio to the second ratio would be effected as clutch C is applied in synchronism with release of clutch B.

An upshift from the third ratio to the fourth ratio would be effected as clutch E is applied in synchronism with release of clutch B.

The torque output side of clutch A is connected through torque transfer element 34 to the torque input side of clutch B during forward drive. The torque output side of clutch B, during forward drive, is connected to shaft 30 through torque transfer element 36.

Reverse drive is established by applying low-and-reverse brake D and clutch B.

For purposes of the present description, any clutch or brake that is involved in a synchronous upshift will be referred to as an oncoming friction element if it is being applied. If it is being released, it will be referred to as an offgoing friction element. The term "friction element" will apply to either a brake or a clutch.

Typically, a transmission of this type would include a lockup clutch or torque converter bypass clutch, as shown at 38, to directly connect turbine shaft 18 to the engine crankshaft after a torque converter torque multiplication mode is completed and a hydrokinetic coupling mode begins.

For the purpose of illustrating one example of a synchronous ratio upshift for the transmission of FIG. 1, it will be assumed that an upshift will occur between the third ratio and the fourth ratio. On such a 3–4 upshift, friction element B is released and friction element E is applied as friction element A remains applied. Another example of a ratio upshift would be an upshift from the second ratio to the third ratio. On a 2–3 upshift, friction element C would be released and friction element B would be applied as friction element A remains applied. Each of these upshifts involves an offgoing friction element and an oncoming friction element.

Figure 2:
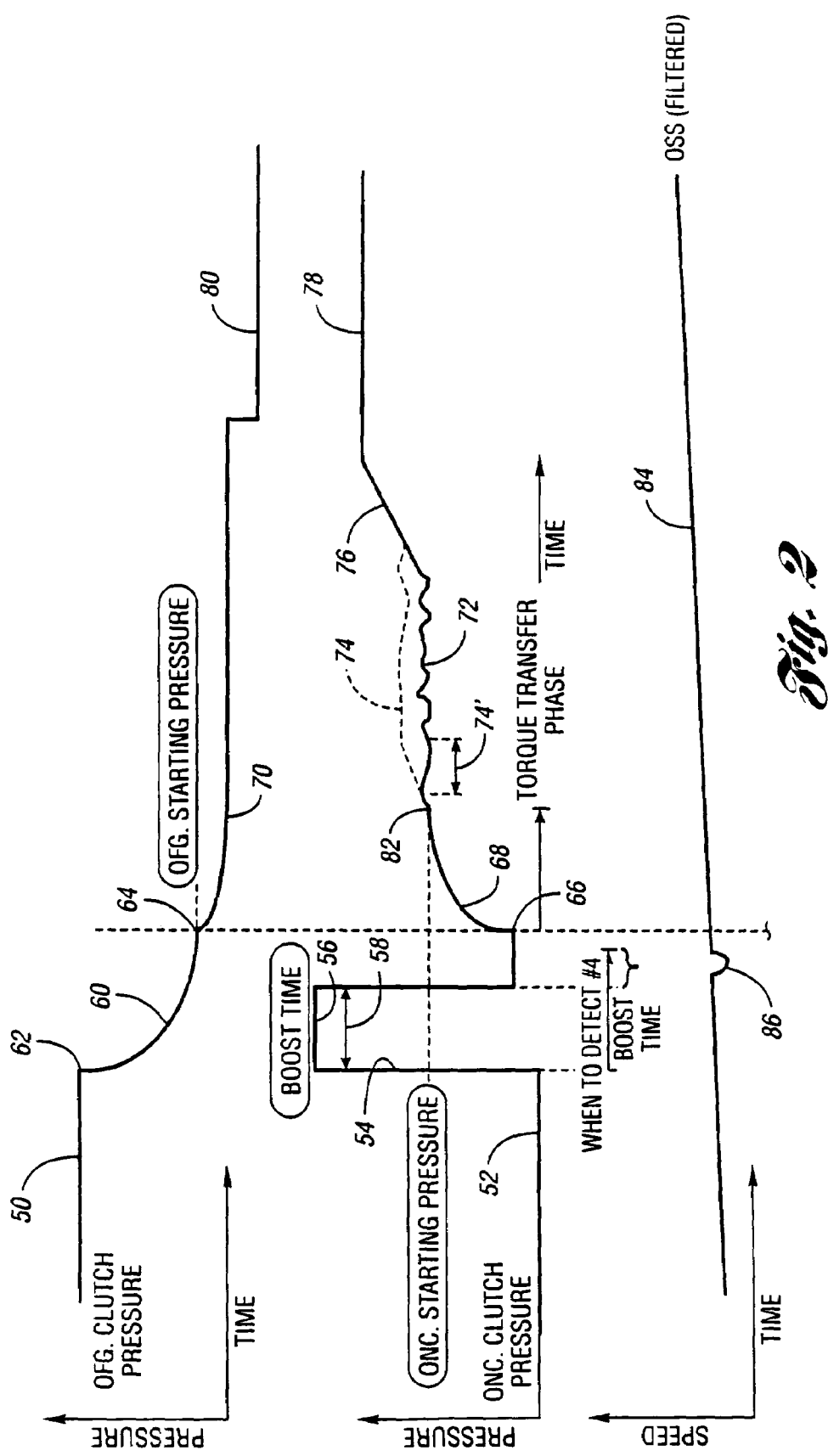
FIG. 2 is a time plot of the pressures on an offgoing friction element and an oncoming friction element during a synchronous upshift.
Figure 3:
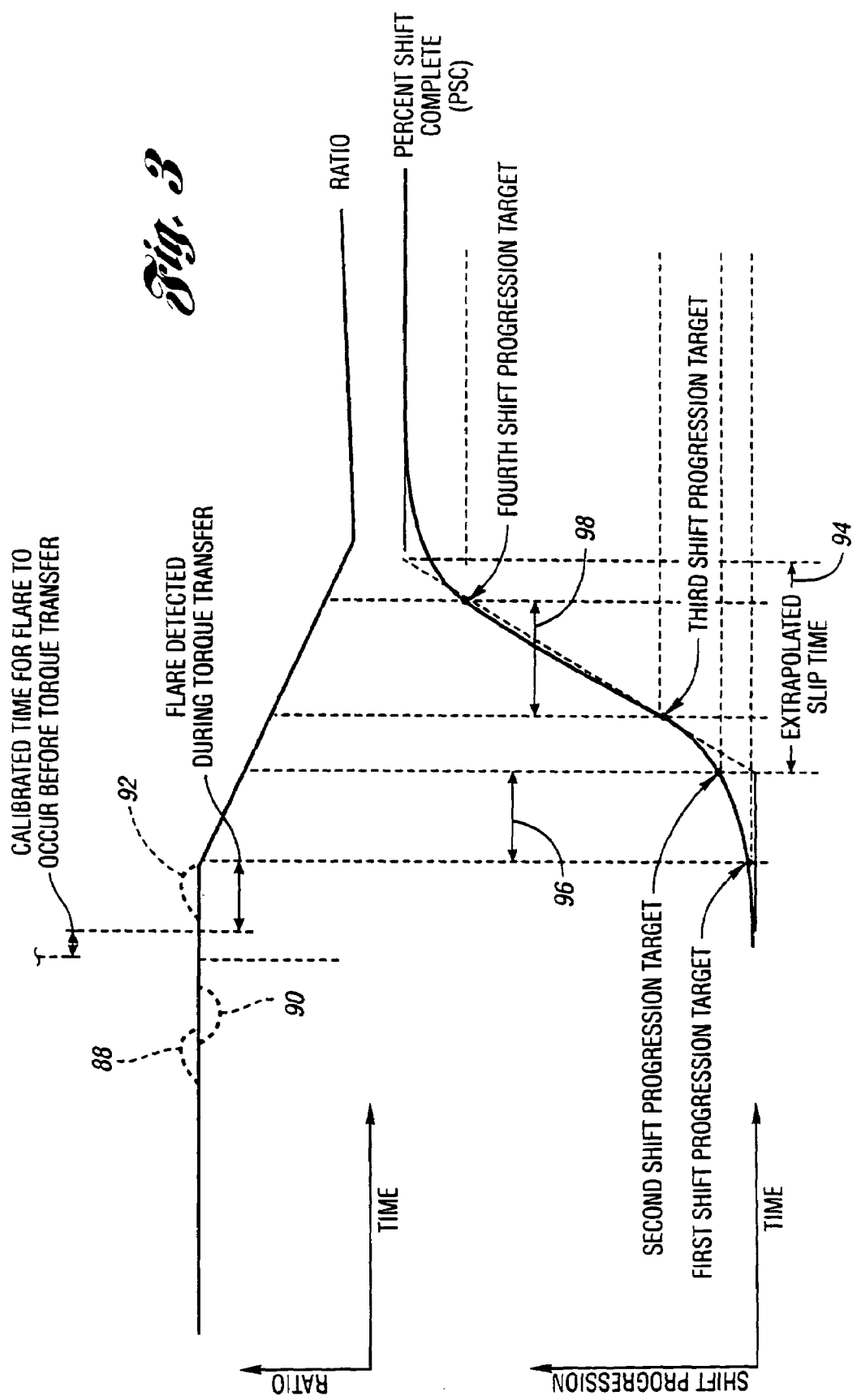
FIG. 3 is a time plot of a ratio change during a synchronous upshift and a plot of a percentage shift complete for each friction element during a synchronous upshift.

The synchronous upshift adaptive pressure control calibration, illustrated in FIGS. 2 and 3, can refer to any one of the offgoing clutches and any one of the oncoming clutches.

In FIG. 2, numeral 50 designates the offgoing friction element pressure before an upshift occurs. The offgoing friction element is fully applied. The corresponding friction element pressure 52 for the oncoming friction element has not yet been increased. At point 54, in FIG. 2, the oncoming friction element pressure is boosted to a value indicated at 56. This will ensure that the pressure actuated servo for the oncoming friction element is fully stroked so that the oncoming friction element is conditioned for an upshift.

The boost time at 56 is applied for a calibrated time, shown at 58. During boost time 58, the offgoing friction element pressure is reduced gradually, as shown at 60, beginning at time 62. At time 64, the offgoing friction element pressure is at a minimum value, sufficient only to maintain friction element capacity until the beginning of the upshift. The value of the pressure at 64 is a stored value in the keep-alive memory (KAM) of the microprocessor of the controller, as will be explained subsequently.

At point 66 in FIG. 2, torque transfer from the offgoing friction element to the oncoming friction element begins. That is the beginning of a so-called torque transfer phase of the upshift. The pressure on the oncoming friction element is increased, as shown at 68, simultaneously with the beginning of the decrease of the offgoing friction element pressure, as shown at 70.

After a torque transfer is completed, the friction elements slip as pressure on the oncoming friction element is controlled using a closed-loop controller such as a proportional-integral-derivative (PID) controller, which results in the trace shown at 72. This is explained in the co-pending patent application identified previously.

If the oncoming clutch pressure at the start of torque transfer is too low, the pressure is aggressively ramped up during time 74' to the value at 74, so that pressure control, using the closed-loop controller, can begin to establish synchronism between oncoming friction element application and offgoing friction element release.

After the closed-loop control trace at 72 ends, the pressure on the oncoming friction element is ramped up, as shown at 76, to its maximum value 78. At that point the shift is complete. When the oncoming friction element pressure reaches its maximum value, the offgoing friction element pressure is decreased to its release value, as shown at 80.

The critical characteristics of the shift, which are sometimes referred to as shift parameters, are the oncoming starting pressure for the oncoming friction element, as shown at 82; the boost time, as shown at 58; and the starting pressure for the offgoing friction element, as shown at 64.

In FIG. 2, the output shaft speed (filtered) is shown at 84. The output shaft speed plot 84 slopes upward since the output shaft speed increases during the upshift.

A small tie up condition will be present if the boost time at 56 is too high at the beginning of the torque transfer at point 66. If it is too high, the offgoing friction element will not have lost sufficient capacity to avoid simultaneous engagement of the friction elements. This causes a small tie up to occur, which is evidenced by a small dip in the output shaft speed plot 84. The dip is shown at 86 in FIG. 2. The tie up dip 86 may occur also if the boost time 58 is longer than it should be relative to the time of decreasing offgoing friction element pressure at 60.

In contrast to the small tie up dip illustrated at 86 in FIG. 2, it is possible to obtain a so-called large tie up before the torque transfer phase begins. This occurs when the shift begins too early, either during the boost phase or the stroke phase of the oncoming friction element. A large tie up would indicate an overboost of the oncoming friction element pressure.

In FIG. 3, a flare, shown at 88, will occur if, before the torque transfer phase, the offgoing friction element starting pressure is too low.

A large tie up is illustrated by the dip at 90 in FIG. 3. This will occur, as indicated above, if the oncoming friction element pressure is overboosted before the torque transfer phase begins at point 66 in FIG. 2.

A flare condition during the torque transfer phase is illustrated in FIG. 3 at 92. This may occur if the pressure on the oncoming friction element is underboosted. Ratio flares and tie ups are detected by comparing turbine speed to output shaft speed times gear ratio.

In the shift progression plot of FIG. 3, the extrapolated slip time for the friction elements is indicated at 94. This is the time between a second calibrated shift progression target value and the end of the shift. One way to measure shift progression involves the use of a percentage shift complete value (PSC). If an adjustment in the initial slip time is needed, the starting pressure adjustment can be carried out during the time indicated at 96 in FIG. 3. This is the time between a first and the second calibrated shift progression target values. In FIG. 3, the overall friction element slip time, which is one of the measurements made by the control system, is shown at 98. This is the time between third and fourth calibrated shift progression target values.

Flare is another measured operating condition. If no flare is measured, the offgoing clutch pressure may be reduced for the purpose of achieving a small amount of flare before torque transfer, during a calibrated time shown in FIG. 3, by allowing the offgoing friction element pressure to be slightly low. The small amount of flare, however, should not be allowed to increase to a value that will cause a torque disturbance in the output shaft.

There are a large number of adaptive adjustments to the operating characteristics or parameters described in the preceding discussion. These adjustments are written into tables, stored in memory, that are functions of the current operating conditions.

Figure 4:
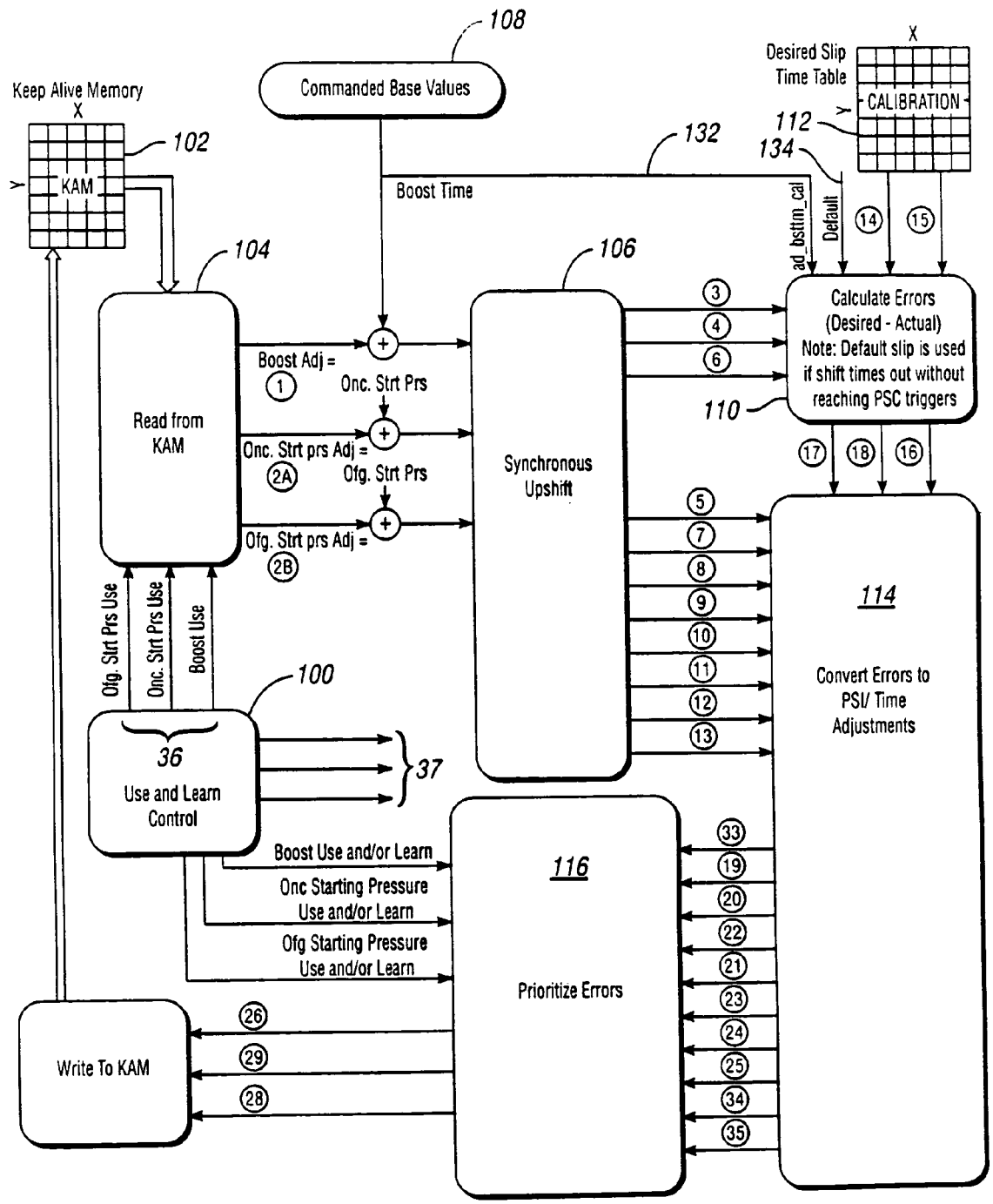
FIG. 4 is the synchronous shift adaptive pressure control architecture for the transmission of FIG. 1.

The adaptive algorithm, during a synchronous upshift, is carried out as shown in the pressure controller architecture illustrated in FIG. 4. This includes a "use-and-learn" control unit 100, which monitors the operating conditions to determine the state of adaptive control for the current shift. Control unit 100 determines whether adaptive values should be read from a keep-alive memory 102 or writing to memory 102 is allowed. The latter is referred to as "learning enabled." The former is referred to as "use enabled."

Action block 104 is a "read from KAM" control unit. Using four point interpolation based on current operating conditions, the action block 104 reads the appropriate adaptive adjustments from memory 102 to control the pressure boost time, the offgoing friction element starting pressure and the oncoming friction element starting pressure. These three adjustments are added to base commanded values from control unit 108. The co-pending patent application, which is incorporated herein by reference, describes how these base values are developed.

Action block 106 is a control unit that monitors shift event data. It receives boost time information, offgoing friction element starting pressure information, and oncoming friction element starting pressure information from action block 104. Action block 106 then delivers the monitored shift event data to a computation unit at block 114 where pressure errors and time errors are converted to pressure adjustments, as will be explained subsequently.

As mentioned previously, the boost time information is the amount of time required to fill an oncoming friction element prior to beginning of the stroke phase. The offgoing starting pressure is the offgoing friction element pressure reduction prior to beginning the ratio change. This corresponds to the friction element capacity below which the friction element will begin to slip. The oncoming starting pressure is the pressure that corresponds to the oncoming friction element capacity needed to begin the ratio change, taking into account the expected inertia shift torques.

The boost time adjustment information, shown at "1" in FIG. 4 is added to a desired commanded boost time from control unit 108, as shown at 132. The sum then is delivered to the synchronous upshift action block 106.

The oncoming friction element starting pressure that is commanded for a given control loop of the processor is added to the oncoming starting pressure adjustment "2A" from KAM memory 104 and delivered to the synchronous upshift action block 106. The offgoing friction element starting pressure is a commanded pressure, which is added to the offgoing friction element starting pressure adjustment "2B" received from KAM memory 104 and delivered to action block 106.

Shift events are stored in action block 106, including a ratio change time plot for both the offgoing friction element and the oncoming friction element. It contains also a time plot of the shift progression for each friction element during a shift in the preceding control loop of the processor. This feature also is explained further in the disclosure of the co-pending patent application identified above.

Action block 110 receives monitored overall friction element slip time information, as shown at "3", information regarding initial slip time measured at the start of the shift, as shown at "4", and the duration of the boost phase, as shown at "6".

Desired calibrated slip tables are stored in memory registers in tables 112. The calculation action block 110 receives from the tables 112 desired overall slip time and desired initial slip time, based on current shift conditions. Those values at "4" and "15", together with desired boost time, are compared to the monitored overall slip time at "3", the initial slip time measured at the start of the shift, as shown at "4", and the duration of the boost phase, as shown at "6". After the measured values are compared to the desired values, an error is determined at "16", which is the boost time error when a ratio change starts during the boost phase. This is equal to the desired boost time plus adaptive boost time minus the actual boost time. Action block 110 also determines the overall slip time error, as shown at "17", and the initial slip time error, as shown at "18". These errors, "17" and "18", are equal to the desired slip time plus adaptive slip time minus actual time.

The information received from action block 106 includes the on or off state of a flag that indicates a ratio change has started during the boost, as shown at "5", and a flag indicating an aggressive ramp was reached during the shift, as shown at "7". If there is an aggressive ramp called for, the duration of the aggressive ramp is received from action block 106, as shown at "8". Other information includes the state of the flag "9", indicating a flare during the torque transfer phase; and the magnitude of the flare during the torque transfer phase, as shown at "10". Another flag state "11" indicates flare before the torque transfer phase; and the magnitude of the flare before the torque transfer phase is indicated at "12". Another flag state "13" indicates whether there is a tie up detected in the output shaft.

The desired overall slip time and the desired initial slip time, received from slip tables 112, are based on the current shift conditions.

The errors are received at a computation module shown in FIG. 4 as block 114 where the errors are converted to pressure and time adjustments. These adjustments are indicated in FIG. 4. The first adjustment at "33" is the conversion of the aggressive ramp error to offgoing friction element starting pressure. The adjustment at "19" is the conversion of the ratio change detected during the boost phase to a boost time value. The error adjustment at "20" is the conversion of the aggressive ramp error to the oncoming friction element starting pressure. The adjustment at "21" is the conversion of the initial slip time error to the oncoming starting pressure value. The error at "22" is the conversion of the overall slip time error to the oncoming friction element starting pressure value. The error at "23" is the conversion of flare during torque transfer to boost adjustment time. The error at "24" is the conversion of flare before torque transfer to offgoing friction element starting pressure. The error at "25" is the conversion of tie up detected near the boost phase to boost adjustment time. The error at "34" is the conversion of flare during a torque transfer phase to offgoing friction element starting pressure. The error at "35" is the conversion of the PID control effort to oncoming starting pressure.

A prioritizing module is shown in FIG. 4 as block 116. This module will prioritize the error adjustments received from block 114. This is where it is determined which error will be corrected first during any given shift. If an actual boost time value must be written to KAM memory at 104, that adjustment is shown at "26". If actual oncoming starting pressure for the oncoming friction element must be adjusted, that value is determined at "29", and is written to KAM memory at 102. If actual offgoing friction element starting pressure adjustment must be made, that value, as shown at "28", is written to KAM memory at 102.

As indicated earlier, block 100 monitors the operating conditions to determine the state of the adaptive adjustments for the current shift. It controls, as shown at "36", whether the adaptive values from KAM memory 102 should be used and whether writing to KAM memory at 102 should be allowed, as indicated at "37". It also indicates why the adaptive "use-and-learn" capability at block 100 is off for a control loop of the processor during a current shift. This information is useful for calibration purposes.

One of the information items needed at action block 110 to calculate errors is the previously mentioned desired or commanded boost time. That information is distributed to block 110 from block 108, as shown at 132.

If the shift characteristics are so severely in error that the controller lacks the ability to make a corrective adjustment, a default value for the characteristics will be commanded as shown by the default trigger 134 at the input side of block 110.

Figure 5A:
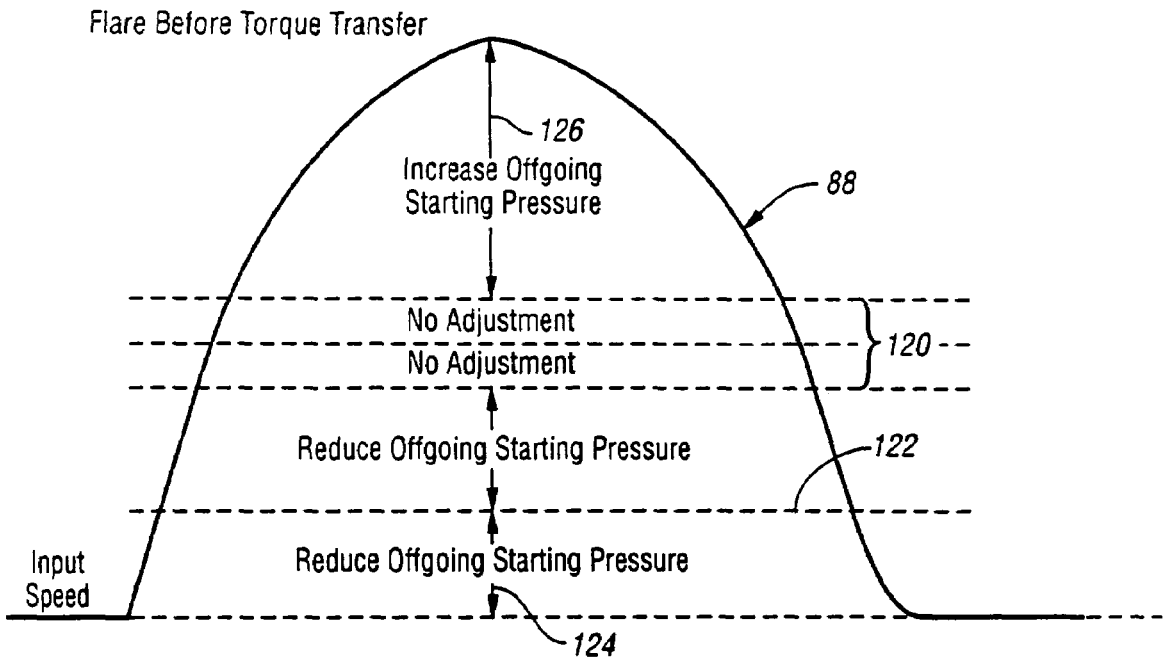
FIG. 5a is a schematic illustration of a synchronous upshift flare and flare-based adaptive adjustments when the flare occurs before torque transfer.
Figure 5B:
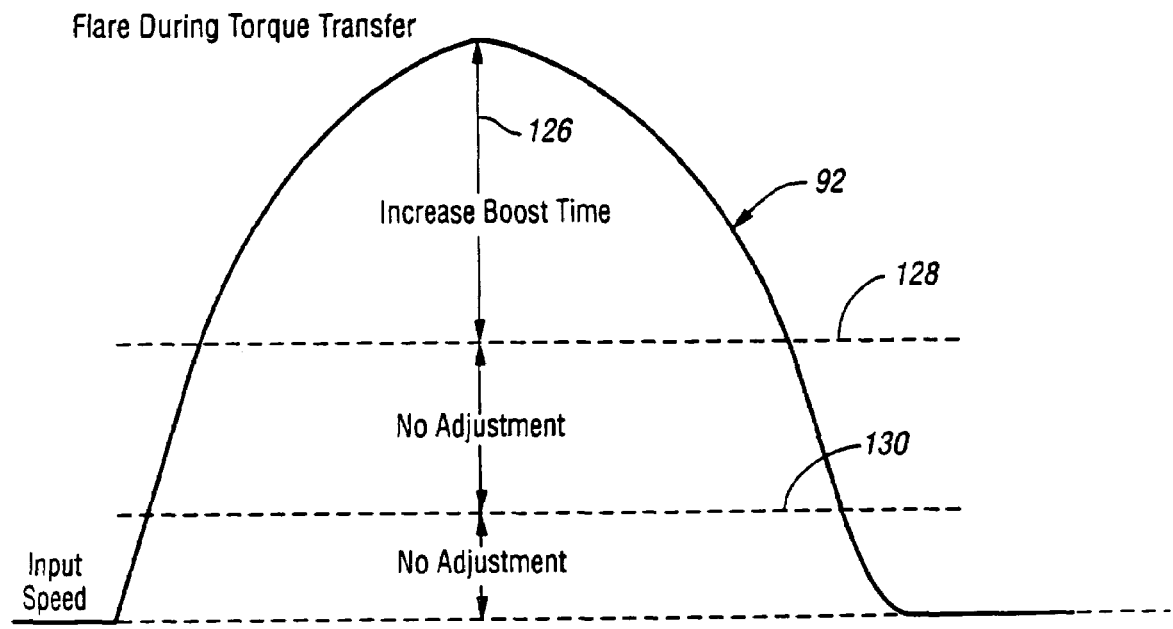
FIG. 5b is a schematic illustration of a synchronous upshift flare and flare-based adaptive adjustments when the flare occurs during torque transfer.

FIG. 5a is a schematic representation of a flare condition before torque transfer begins. Flare previously was discussed with reference to FIG. 3b. Similarly, FIG. 5b is a schematic illustration of a flare condition during torque transfer. This also was discussed previously with reference to FIG. 3b.

If the magnitude of the flare falls within the measurement band 120 in FIG. 5a, no adjustment is required. This amount of flare can be tolerated without an undesirable, perceptible torque disturbance in the output shaft. A minimum speed at which flare can be detected will result in flare of a value, shown at 122, which is well below the band 120. An ideal ratio change would fall within the range shown at 120.

If the flare is greater than the values within band 120, offgoing friction element starting pressure will be increased, as shown at 126, to reduce the flare.

If flare occurs during torque transfer, that characteristic is plotted in FIG. 5b. If the flare is in a region above threshold 128, an increase in boost time for the oncoming friction element is needed. If the flare is below the threshold 128, no adjustment is needed. When flare is measured at the minimum speed at which flares can be detected, that flare is illustrated at 130.

The prioritization rules for an adaptive synchronous upshift are set forth in the following table (Parts 1–10). The information in that table is stored in block 116 of FIG. 4.

Priority Table

| Priority | #12 Positive Controller Effort(adds prs) | #11 Negative Controller Effort(Removes prs) | #10 Slip time too long (moderate error) | #9 Slip time too long (large error) | #8 Slip time too short (moderate error) | #7 Slip time too short (large error) | #6 Initial Slip Time Error | #5 Flare During Torque transfer | #4 Small Tie-up Before TT (measured on OSS) | #3 Aggressive Ramp reached | #2 Flare Before Torque Transfer | #1 Large Tie up before TT (measured on TT ratio) | Characteristic to Adapt | Rationale |
|---|---|---|---|---|---|---|---|---|---|---|---|---|---|---|
| 0 | F | F | F | F | F | F | F | F | F | F | F | F | None(May reduce Ofg strt prs) | |
| 1 | * | * | * | * | * | * | * | * | * | * | F | T | Reduce Boost Time | Large tie up indicates overboost. |
| 2 | * | * | * | * | * | * | * | * | F | F | T | F | Inc Ofg Strt Prs | Flare before TT indicates insufficient ofg starting pressure. |
| 2A | * | * | * | * | * | * | * | * | F | T | T | F | Inc Ofg Strt Prs<br>Inc Onc Strt Prs | Flare before TT indicates insufficient ofg starting pressure. Also adapt for the aggressive ramp, since the presence of flare due to the offgoing clutch does not have an effect on hitting aggressive ramp. |
| 3 | * | * | * | * | * | * | * | * | * | * | T | T | Inc Ofg Strt Prs<br>Reduce Boost Time | Offgoing starting pressure and boost time can be adjusted independently. |
| 4 | * | * | * | * | * | * | * | * | T | F | T | F | Inc Ofg Strt Prs<br>Reduce Boost Time | Flare before TT indicates insufficient ofg starting pressure. A tie up detected in OSS indicates too much boost time. Additionally, since vehicle data shows that slight overboost can cause driveline disturbances that may look like a flare, it is best to correct both errors at the same time. |
| 4a | * | * | * | * | * | * | * | * | T | T | T | F | Inc Ofg Strt Prs<br>Reduce Boost Time<br>Inc Onc Strt Prs | Flare before TT indicates insufficient ofg starting pressure. A tie up detected in OSS indicates too much boost time. Additionally, since vehicle data shows that slight overboost can cause driveline disturbances that may look like a flare, it is best to correct both errors at the same time. Also adapt for the aggressive ramp, since the presence of flare due to the |

-continued

Priority Table

| Priority | #12 Positive Controller Effort (adds prs) | #11 Negative Controller Effort (Removes prs) | #10 Slip time too long (moderate error) | #9 Slip time too long (large error) | #8 Slip time too short (moderate error) | #7 Slip time too short (large error) | #6 Initial Slip Time Error | #5 Flare During Torque transfer | #4 Small Tie-up Before TT (measured on OSS) | #3 Aggressive Ramp reached | #2 Flare Before Torque Transfer | #1 Large Tie up before TT (measured on TT ratio) | Characteristic to Adapt | Rationale |
|---|---|---|---|---|---|---|---|---|---|---|---|---|---|---|
| 5 | * | * | * | * | * | F | * | F | F | T | F | F | Inc Onc Strt Prs | offgoing clutch does not have an effect on hitting aggressive ramp. Aggressive ramp indicates low starting pressure. |
| 6 | * | * | * | * | * | F | * | * | T | T | F | F | Inc Onc Strt Prs | Small tie up indicates slight overboost, so fix starting pressure first, then adj boost time once slip times are correct. |
| 7 | * | * | * | * | * | * | * | T | F | T | F | F | Inc Onc Strt Prs Increase Boost Time | If there is no tie up present boost can be adapted at the same time as starting pressure. Do not reduce Ofg starting pressure, since flare is present. |
| 8 | * | * | * | * | * | T | * | F | F | T | F | F | Inc Onc Strt Prs Dec Ofg Strt Prs | Aggressive ramp indicates low starting pressure. Also reduce offgoing starting pressure since the short slip time indicates the torque transfer phase may be slightly tied up. |
| 9 | * | * | * | * | * | T | * | F | T | T | F | F | Inc Onc Strt Prs Dec Ofg Strt Prs | Aggressive ramp indicates low starting pressure. Also reduce offgoing starting pressure since the short slip time indicates the torque transfer phase may be slightly tied up. Fix boost once aggressive ramp is corrected. |
| 10 | * | * | * | * | * | T | * | T | T | T | F | F | Inc Onc Strt Prs | This is an extreme case. Fix the aggressive ramp by increasing onc starting pressure. Do not reduce ofg starting pressure because |

-continued

Priority Table

| Priority | #12 Positive Controller Effort(adds prs) | #11 Negative Controller Effort(Removes prs) | #10 Slip time too long (moderate error) | #9 Slip time too long (large error) | #8 Slip time too short (moderate error) | #7 Slip time too short (large error) | #6 Initial Slip Time Error | #5 Flare During Torque transfer | #4 Small Tie-up Before TT (measured on OSS) | #3 Aggressive Ramp reached | #2 Flare Before Torque Transfer | #1 Large Tie up before TT (measured on TT ratio) | Characteristic to Adapt | Rationale |
|---|---|---|---|---|---|---|---|---|---|---|---|---|---|---|
| 11 | * | * | T | F | | N/A | * | T | F | F | F | F | Increase Boost Inc Onc Strt Prs | of the flare. Leave boost time alone because it would make the flare worse. A flare during TT indicates under boost. |
| 12 | * | * | F | T | | N/A | * | T | F | F | F | F | Increase Boost Time Inc Onc Strt Prs | Adjust both boost time and starting pressure during this condition, since overboost has not been detected. |
| 13 | * | * | F | F | T | | * | T | F | F | F | F | Increase Boost Time Dec Onc Strt Prs | Adjust both boost time and starting pressure during this condition, since overboost has not been detected and aggressive ramp was not reached. |
| 14 | * | * | | | F | | * | T | T | F | F | F | Inc Ofg Strt Prs | This condition indicates a possible error caused by the tau's of the clutches. Reduce the flare by increasing the offgoing clutch pressure. Leave boost time alone until flare is corrected to speed up the rate at which the flare is corrected. Otherwise the logic will bounce between reducing boost time and increasing boost time. |
| 15 | * | * | | T | | N/A | * | T | T | F | F | F | Inc Onc Strt Prs | Small tie up indicates slight overboost, so fix starting pressure first, then adj boost once slip times are correct. Long slip time indicates that the oncoming starting pressure is causing the flare. Don't care about controller effort, because the flare needs to be corrected first. |
| 16 | * | * | | N/A | | T | * | T | T | F | F | F | Dec Onc Strt Prs Inc Ofg Strt Prs | Small tie-up indicates slight overboost, so fix starting pressure first, then adj boost once slip times are correct. Since there is a flare during TT with short slip times and |

-continued

Priority Table

| Priority | #12 Positive Controller Effort (adds prs) | #11 Negative Controller Effort (Removes prs) | #10 Slip time too long (moderate error) | #9 Slip time too long (large error) | #8 Slip time too short (moderate error) | #7 Slip time too short (large error) | #6 Initial Slip Time Error | #5 Flare During Torque transfer | #4 Small Tie-up Before TT (measured on OSS) | #3 Aggressive Ramp reached | #2 Flare Before Torque Transfer | #1 Large Tie up before TT (measured on TT ratio) | Characteristic to Adapt | Rationale |
|---|---|---|---|---|---|---|---|---|---|---|---|---|---|---|
| 17 | F | F | | | F | | * | F | T | F | F | F | Reduce Boost Time | a small tie up, also correct the offgoing starting pressure. Don't care about controller effort, because the flare needs to be corrected first. A small tie up without any other errors indicates overboost |
| 17A | F | T | | | F | | * | F | T | F | F | F | Reduce Boost Time Dec Onc Strt Prs | A small tie up without any other errors indicates overboost. Negative controller effort indicates too much starting pressure and is independent of the tie up. |
| 17B | T | F | | | F | | * | F | T | F | F | F | Reduce Boost Time Inc Onc Strt Prs | A small tie up without any other errors indicates overboost. Positive controller effort indicates not enough starting pressure and is independent of the tie up. |
| 18 | F | F | T | | | N/A | * | F | T | F | F | F | Reduce Boost Time Inc Onc Strt Prs | Adjust both boost time and starting pressure, since the errors are fairly small |
| 18A | F | T | T | | | N/A | * | F | T | F | F | F | Reduce Boost Time Dec Onc Strt Prs | Adjust both boost time and starting pressure, since the errors are fairly small. Decrease starting pressure, because it is assumed that the cause of the long slip time is the controller effort taking out too much pressure. |
| 18B | T | F | T | | | N/A | * | F | T | F | F | F | Reduce Boost Time Inc Onc Strt Prs | Adjust both boost time and starting pressure, since the errors are fairly small. Increase starting pressure by larger of controller effort or slip time, since they are both indicating low starting pressure. |
| 19 | F | F | F | | | T | * | F | T | F | F | F | Reduce boost Time Dec Onc Strt Prs | For short slip time errors it should also be OK to adapt boost time and starting pressure |

-continued

Priority Table

| Priority | #12 Positive Controller Effort(adds prs) | #11 Negative Controller Effort(Removes prs) | #10 Slip time too long (moderate error) | #9 Slip time too long (large error) | #8 Slip time too short (moderate error) | #7 Slip time too short (large error) | #6 Initial Slip Time Error | #5 Flare During Torque transfer | #4 Small Tie-up Before TT (measured on OSS) | #3 Aggressive Ramp reached | #2 Flare Before Torque Transfer | #1 Large Tie up before TT (measured on ratio) | Characteristic to Adapt | Rationale |
|---|---|---|---|---|---|---|---|---|---|---|---|---|---|---|
| 19A | F | T | F | F | | T | * | F | T | F | F | F | Reduce Boost Time Dec Onc Strt Prs | Adjust both boost time and starting pressure, since the errors are fairly small. Decrease starting pressure by larger of controller effort and slip time, since they are both indicating high starting pressure. |
| 19B | T | F | F | F | | T | * | F | T | F | F | F | Reduce Boost Time Inc Onc Strt Prs | Adjust both boost time and starting pressure, since the errors are fairly small. Decrease starting pressure, because it is assumed that the cause of the short slip time is the controller effort adding too much pressure. |
| 20 | F | F | T | T | | N/A | * | F | F | F | F | F | Inc Onc Strt Prs | Long slip times are caused by onc starting prs. |
| 20A | F | T | T | T | | N/A | * | F | F | F | F | F | Dec Onc Strt Prs | Decrease starting pressure, because it is assumed that the cause of the long slip time is the controller effort taking out too much pressure. |
| 20B | T | F | T | T | | N/A | * | F | F | F | F | F | Inc Onc Strt Prs | Increase starting pressure by larger of controller effort and slip time, since they are both indicating low starting pressure. |
| 21 | F | F | N/A | N/A | | T | * | F | F | F | F | F | Dec Onc Strt Prs | Short slip times are caused by onc starting prs. |
| 21A | F | T | N/A | N/A | | T | * | F | F | F | F | F | Dec Onc Strt Prs | Decrease starting pressure by larger of controller effort and slip time, since they are both indicating high starting pressure. |
| 21B | T | F | N/A | N/A | | T | * | F | F | F | F | F | Inc Onc Strt Prs | Increase starting pressure, because it is assumed that the cause of the short slip time is the controller effort adding too much pressure. |
| 22 | F | F | | | F | | T | F | F | F | F | F | Inc/Dec Onc Strt Prs Dec Ofg Strt Prs | Once adjust based on initial slip time when the rest of the shift looks OK. Can also reduce offgoing starting |

-continued

Priority Table

| Priority | #12 Positive Controller Effort(adds prs) | #11 Negative Controller Effort(Removes prs) | #10 Slip time too long (moderate error) | #9 Slip time too long (large error) | #8 Slip time too short (moderate error) | #7 Slip time too short (large error) | #6 Initial Slip Time Error | #5 Flare During Torque transfer | #4 Small Tie-up Before TT (measured on OSS) | #3 Aggressive Ramp reached | #2 Flare Before Torque Transfer | #1 Large Tie up before TT (measured on TT ratio) | Characteristic to Adapt | Rationale |
|---|---|---|---|---|---|---|---|---|---|---|---|---|---|---|
| 23 | F | F | F | F | F | F | F | F | F | F | F | F | Dec Ofg Strt Prs | pressure if no flares are present. Slowly decrease offgoing starting pressure to base calibration value if no flare is present before torque transfer. This is intended to prevent gradual learning up of offgoing starting pressure over the life of the vehicle, without adjustments back down. |

\* = Don't Care (other conditions take precedence)
N/A = condition not possible - Treat as a don't care The lefthand column of the prioritization rules, set forth in the preceding table, is a priority schedule. The highest priority adjustment is identified by numeral 1. The least priority adjustment for the various computed errors are identified at the top of the prioritization rule table. They are identified by reference numerals 12 through 1, reading from left to right. Measurement 1, for example, would indicate a large tie up before torque transfer, because that condition is directly above the letter T, which stands for true. The letter F stands for false. Priority action is taken whenever the letter T for one of the measurements is indicated. The measurements are listed in the table in the order of their priority, as indicated in the left-hand column by numerals 1 through 23. Each measurement is compared to the prioritization rule table to determine the action that corresponds to the letter T. The adaptive action that must be taken to correct a condition is shown in the center column of the table under the heading "Characteristic to Adapt."

The highest priority adaptation is reduction of boost time. The next highest priority adaptation has priority 2, which calls for an increase in the offgoing friction element starting pressure to correct for a flare before torque transfer begins. The lowest priority adaptations are adjustments 11 and 12 for negative and positive controller efforts. Controller effort is the area defined by the closed-loop control as shown at 72 in FIG. 2, which is computed by integrating the pressure-time function.

When the oncoming friction element pressure is closed-loop controlled, as shown at 72 in FIG. 2, the pressure profile will have upward fluctuations and downward fluctuations. The total area under the upward fluctuations, as the pressure is integrated with respect to time, is referred to as positive controller effort. The total area above the downward fluctuations, as the pressure is integrated with respect to time, is referred to as negative controller effort.

The rationale for each of the adjustments is indicated in the last column of the prioritization rule table under the heading "Rationale." In the case of the highest priority adjustment previously mentioned, the rationale would be that there is a large tie up, which indicates an overboost. In the case of the next highest priority adjustment, the rationale would be that there is a flare before the torque transfer, which would result from an insufficient starting pressure for the offgoing friction element.

If all of the measured conditions during a current shift are within calibrated limits, the offgoing friction element pressure during a subsequent shift may be reduced slowly to a base calibration value if no flare before torque transfer is present. This is intended to prevent gradual "learning up" of offgoing friction element starting pressure over the life of the transmission without adjustments "back down."

Although an embodiment of the invention has been disclosed, it will be apparent to persons skilled in the art that modifications may be made without departing from the scope of the invention. All such modifications and equivalents thereof are intended to be covered by the following claims.

What is claimed is:

1. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting a tie up before torque transfer during a current shift; and reducing the pressure boost time for the oncoming friction element to reduce the tie up during a subsequent shift, whereby upshift quality is enhanced.

2. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting an aggressive ramping of starting pressure of the oncoming friction element if a ratio change does not begin within a precalibrated time after the oncoming friction element starting pressure is reached during a current shift;

detecting flare before torque transfer during a current shift; and increasing starting pressure for both the offgoing and oncoming friction elements whereby flare before torque transfer is reduced during a subsequent shift, whereby upshift quality is enhanced.

3. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting flare before torque transfer and a large tie up before torque transfer during a current shift; and increasing offgoing friction element starting pressure and reducing pressure boost time for the oncoming clutch whereby both flare before torque transfer and a large tie up before torque transfer can be reduced during a subsequent shift, whereby upshift quality is enhanced.

4. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting flare before torque transfer and a small tie up before torque transfer during a current shift; and increasing offgoing friction element starting pressure and reducing pressure boost time, whereby flare before torque transfer and a small tie up are reduced during a subsequent shift and upshift quality is enhanced.

5. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting flare before torque transfer, a small tie up before torque transfer and an aggressive ramping of starting pressure of the oncoming friction element during a current shift; and increasing offgoing friction element starting pressure, reducing pressure boost time and increasing oncoming friction element starting pressure to reduce flare before torque transfer during a subsequent shift to avoid reaching an aggressive ramping of starting pressure of the oncoming friction element during a subsequent shift and to reduce a small tie up before torque transfer during a subsequent shift, whereby upshift quality is enhanced.

6. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting an aggressive ramping of starting pressure of the oncoming friction element during a current shift; and increasing starting pressure of the oncoming friction element to avoid an aggressive ramping of the oncoming friction element during a subsequent shift, whereby upshift quality is enhanced.

7. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting a small tie up before torque transfer and an aggressive ramping of starting pressure of the oncoming friction element during a current shift; and increasing starting pressure of the oncoming friction element to avoid a small tie up before torque transfer and an aggressive ramp during a subsequent shift, whereby upshift quality is enhanced.

8. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting flare during torque transfer and an aggressive ramping of starting pressure of the oncoming friction element during a current shift; and increasing oncoming friction element starting pressure and increasing pressure boost time to reduce flare during torque transfer and to avoid reaching an aggressive ramp during a subsequent shift, whereby upshift quality is enhanced.

9. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting slip time of the oncoming friction element and aggressive ramping of starting pressure of the oncoming friction element during a current shift; and increasing oncoming starting pressure of the oncoming friction element and decreasing offgoing starting pressure of the offgoing friction element to increase slip time of the oncoming friction element to avoid a tie up and to avoid an aggressive ramp during a subsequent shift, whereby upshift quality is enhanced.

10. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting an aggressive ramping of starting pressure of the oncoming friction element, a small tie up before torque transfer and slip time of the oncoming friction element during a current shift; and increasing starting pressure of the oncoming friction element and decreasing the offgoing starting pressure to avoid an aggressive ramping, a small tie up before torque transfer and a slip time for the oncoming friction element that is too short during a subsequent shifts, whereby upshift quality is enhanced.

11. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting an aggressive ramping of starting pressure of the oncoming friction element, a small tie up before torque transfer, a flare during torque transfer, and slip time for the oncoming friction element; and increasing starting pressure of the oncoming friction element during a current shift to avoid an aggressive ramping, a small tie up, a flare during torque transfer and a slip time for the oncoming friction element that is too short during a subsequent shift, whereby upshift quality is enhanced.

12. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting flare during torque transfer and slip time of the oncoming friction element; and increasing pressure boost time and increasing oncoming friction element starting pressure during a current shift to reduce flare and slip time of the oncoming friction element during a subsequent shift, whereby upshift quality is enhanced.

13. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting flare during torque transfer and slip time for the oncoming friction element during a current shift; and increasing pressure boost time and decreasing the oncoming friction element starting pressure to reduce flare during torque transfer and to increase slip time for the oncoming friction element during a subsequent shift, whereby upshift quality is enhanced.

14. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting flare during torque transfer and a small tie up before torque transfer during a current shift; and increasing offgoing friction element starting pressure to avoid flare during torque transfer and a small tie up before torque transfer during a subsequent shift, whereby upshift quality is enhanced.

15. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting a small tie up before torque transfer, flare during torque transfer and slip time for the oncoming friction element during a current shift; and increasing starting pressure of the oncoming friction element to avoid a small tie up before torque transfer, flare during torque transfer and excessive slip time for the oncoming friction element during a subsequent shift, whereby upshift quality is enhanced.

16. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting a small tie up before torque transfer, flare during torque transfer and slip time for the oncoming friction element during a current shift; and decreasing oncoming friction element starting pressure and increasing offgoing friction element starting pressure;

whereby a small tie up before torque transfer, a flare before torque transfer and a slip time for the oncoming friction element that is too short are avoided during a subsequent shift and upshift quality is enhanced.

17. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting a small tie up before torque transfer during a current shift; and reducing pressure boost time to avoid a small tie up during a subsequent shifts, whereby upshift quality is enhanced.

18. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting a small tie up before torque transfer and a negative controller effort during a current shift; and reducing pressure boost time and decreasing oncoming friction element starting pressure to avoid a small tie up before torque transfer and a negative controller effort during a subsequent shift, whereby upshift quality is enhanced.

19. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting a small tie up before torque transfer and a positive controller effort during a current shift; and reducing pressure boost time and increasing starting pressure for the oncoming friction element;

whereby a small tie up and positive controller effort are avoided during a subsequent shift and upshift quality is enhanced.

20. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting a small tie up and slip time for the oncoming friction element during a current shift; and reducing pressure boost time and increasing starting pressure for the oncoming friction element, whereby a small tie up is avoided and slip time for the oncoming friction element is reduced during a subsequent shift and upshift quality is enhanced.

21. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting a small tie up before torque transfer, slip time of the oncoming friction element and negative controller effort during a current shift; and reducing pressure boost time and decreasing oncoming friction element starting pressure to avoid a small tie up, to shorten slip time for the oncoming friction element and to avoid a negative controller effort during a subsequent shift, whereby upshift quality is enhanced.

22. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting a small tie up before torque transfer and slip time for the oncoming friction element; and reducing boost time and increasing oncoming friction element starting pressure to avoid a small tie up and to avoid a slip time for the oncoming friction element that is too short, whereby upshift quality is enhanced.

23. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting a small tie up before torque transfer and slip time for the oncoming friction element during a current shift; and reducing pressure boost time and decreasing oncoming friction element starting pressure, whereby a small tie up before torque transfer is avoided and slip time for the oncoming friction element is increased during a subsequent shift and upshift quality is enhanced.

24. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting a small tie up before torque transfer, slip time for the oncoming friction element and a negative controller effort during a current shift; and reducing pressure boost time and decreasing oncoming friction element starting pressure by the larger of pressures indicated by controller effort and slip time, whereby a small tie up is avoided, slip time for the oncoming friction element is increased and negative controller effort is avoided during a subsequent shift and upshift quality is enhanced.

25. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting a small tie up, slip time for the oncoming friction element and positive controller effort during a current shift; and reducing pressure boost time and decreasing oncoming friction element starting pressure to avoid a slip time that is too short and a positive controller effort during a subsequent shift, whereby upshift quality is enhanced.

26. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting slip time for the oncoming friction element during a current shift; and increasing oncoming friction element starting pressure during a current shift, whereby slip time for the oncoming friction element is reduced during a subsequent shift and upshift quality is enhanced.

27. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting slip time for the oncoming friction element and a negative controller effort during a current shift; and decreasing starting pressure for the oncoming friction element, whereby slip time for the oncoming friction element is decreased and negative controller effort is avoided during a subsequent shift and upshift quality is enhanced.

28. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting slip time for the oncoming friction element and positive controller effort during a current shift; and increasing starting pressure for the oncoming friction element by the larger of the pressures indicated by controller effort and slip time, whereby slip time for the oncoming friction element is reduced and positive controller effort is avoided during a subsequent shift and upshift quality is enhanced.

29. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting slip time for the oncoming friction element during a current shift; and decreasing starting pressure for the oncoming friction element, whereby slip time for the oncoming friction element is increased during a subsequent shift and upshift quality is enhanced.

30. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting slip time for the oncoming friction element and a negative controller during a current shift; and decreasing oncoming friction element starting pressure by the larger of the pressures indicated by controller effort and slip time during a current shift, whereby negative controller effort is avoided and slip time for the oncoming friction element is increased during a subsequent shift and upshift quality is enhanced.

31. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting slip time and a positive controller effort during a current shift; and increasing starting pressure of the oncoming friction element;

whereby slip time for the oncoming friction element is increased and a positive controller effort is avoided during a subsequent shift and upshift quality is enhanced.

32. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

monitoring operating conditions during a current upshift;

detecting an initial slip time error for the oncoming friction element during a current shift; and changing the starting pressure for the oncoming friction element and decreasing the starting pressure of the offgoing friction element, whereby the initial slip time error is reduced and upshift quality is enhanced.

33. An adaptive control method for an electronic ratio shift controller for a multiple ratio transmission, the transmission comprising gear elements defining plural torque flow paths between a torque input shaft and a torque output shaft, and pressure-actuated friction elements selectively establishing an upshift in gear ratio as an oncoming friction element and an offgoing friction element are applied and released, the upshift having adaptive shift characteristics including the time required to fill a pressure-actuated friction element with pressure fluid, the offgoing friction element pressure of the start of a ratio change, and the oncoming friction element pressured needed to begin a ratio change, the control method comprising the steps of:

applying boost pressure to the oncoming friction element at the start of an upshift in substantial synchronism with a reduction in pressure for the offgoing friction element;

controlling the boost time that the boost pressure is applied to the oncoming friction element;

controlling pressure for the offgoing friction element to an offgoing friction element starting pressure corresponding approximately to friction element torque capacity below which the offgoing friction element will begin to slip prior to a torque transfer between the friction elements;

controlling pressure for the oncoming friction element from a boost time value to an oncoming friction element starting pressure value required to begin an upshift;

measuring at least one of a set of monitored operating conditions during a current shift event including;
(1) a tie-up before torque transfer, indicating an early shift due to overboosting of the oncoming clutch;
(2) a flare before torque transfer;
(3) an aggressive ramp of pressure for the oncoming friction element, indicating low oncoming starting pressure on the oncoming clutch;
(4) a tie-up, indicating an overboost of the oncoming friction element;
(5) flare during torque transfer;
(6) initial slip time from a start of a ratio change to a predetermined amount of slip;
(7) overall slip time during a ratio shift; and
(8) whether no flare occurs, indicating offgoing friction element pressure can be reduced; and
(9) closed-loop control time for controlling pressure on the oncoming friction element;

adjusting one or more of the adaptive shift characteristics during a subsequent shift event in response to changes in the monitored operating conditions; and prioritizing pressure adjustments and time adjustments for the friction elements whereby at least one of the characteristics of a subsequent shift event, including pressure boost time for the oncoming friction element, starting pressure for the offgoing friction element and starting pressure for the oncoming friction element can be changed by using monitored operating conditions in a predetermined order of priority.

34. The adaptive control method of claim 33 wherein the step of prioritizing pressure adjustments and time adjustments includes using more than one operating condition to simultaneously effect adaptive changes in the shift characteristics for a subsequent shift event.

35. The adaptive method set forth in claim 33 including the steps of detecting whether the monitored operating conditions are within predetermined calibrated values during a current shift; and decreasing offgoing friction element starting pressure to a base calibration value if no flare before torque transfer is present during a subsequent shift event.

* * * * *